United States Patent [19]

Bschorr

[11] 4,392,522

[45] Jul. 12, 1983

[54] TIRE WITH OPEN CELL FOAM INSERT FOR REDUCING NOISE

[75] Inventor: Oskar Bschorr, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 202,883

[22] Filed: Nov. 3, 1980

[30] Foreign Application Priority Data

Nov. 16, 1979 [DE] Fed. Rep. of Germany ....... 2946273

[51] Int. Cl.³ ............................................. B60C 18/00
[52] U.S. Cl. .................................. 152/341; 152/330 R
[58] Field of Search ............... 152/158, 157, 165, 166, 152/313, 318, 323, 330 RF, 338, 340, 341, 366, 400, 327; 181/288, 294, 296

[56] References Cited

U.S. PATENT DOCUMENTS

| | | | |
|---|---|---|---|
| 3,381,735 | 5/1968 | Talcott et al. | 152/313 |
| 3,605,848 | 9/1971 | Lombardi et al. | 152/313 |
| 3,828,836 | 8/1974 | Bradley | 152/158 |
| 3,993,114 | 11/1976 | Hinderks | 152/340 |
| 4,008,743 | 2/1977 | Welch | 152/400 |
| 4,071,386 | 1/1978 | Gomberg | 152/330 RF |
| 4,212,338 | 7/1980 | Tiemann | 152/158 |
| 4,246,948 | 1/1981 | Sarkissian | 152/330 RF |
| 4,248,286 | 2/1981 | Curtiss et al. | 152/330 RF |
| 4,281,700 | 8/1981 | Ross | 152/313 |

OTHER PUBLICATIONS

National Bureau of Standards (NBS), Mechanics of Pneumatic Tires, 1971, pp. 726-730.
Richards, Automotive Tire Noise-A Comprehensive Study, Sound and Vibration, May 1974, pp. 42-47.

Primary Examiner—Michael W. Ball
Attorney, Agent, or Firm—W. G. Fasse; D. H. Kane, Jr.

[57] ABSTRACT

The noise caused by vehicle tires rolling on a road surface is reduced by enclosing in the space confined by the tire and the wheel rim a noise or sound absorbing or insulating material which may assume various shapes. This noise absorbing or insulating material may be connected to the inner tire surface or to the rim surface facing into the tire. Thus, the material is not externally visible once the tire has been mounted on the wheel rim.

5 Claims, 8 Drawing Figures

TIRE WITH OPEN CELL FOAM INSERT FOR REDUCING NOISE

CROSS-REFERENCE TO RELATED APPLICATION

The present application corresponds to German Patent Application No. P 2,946,273.5-21, filed in the Federal Republic of Germany on Nov. 16, 1979. The priority of said German Patent Application is hereby expressly claimed.

BACKGROUND OF THE INVENTION

The invention relates to a method for reducing the noise caused by vehicle tires of passenger cars, trucks, and the like rolling on a surface, such as a road surface or a runway surface.

It is a fact that tire noise contributes substantially to the traffic noise. It has been found that at a speed of about 50 km/hour the engine noise and the tire noise are approximately equal to each other. However, when the speed is increased the tire noise rises substantially and exceeds the engine noise so that the tire noise becomes predominant. Relatively little has been done heretofore in order to alleviate or avoid this problem. Practical approaches to this problem heretofore aimed at reducing tire noise emissions by respectively designing the external tire contour, for example, by providing the tire tread with an uneven pitch. This type of tire tread has reduced the apparent tire noise to some extent. However, the apparent reduction is not so much in an absolute diminishing of the noise generated, but rather in shifting the frequency of the generated noise into a range which is apparently less bothersome. Efforts to actually reduce the body noise emission and the so-called "air pumping" have met with little success heretofore.

Our investigations in this area have shown that for this type of noise another generating mechanism is controlling. It has been found that due to the irregularities in the tire itself the repeated rolling movement causes nonstationary movement of the tire walls. Such tire wall movement simultaneously radiates noise outwardly of the tire and also into the space defined by the tire and filled with air under pressure. Due to the higher air density and due to the space resonances the radiation resistance inside the tire is substantially larger than outside thereof, whereby substantially more noise energy is transmitted into the tire than outwardly. Further, due to the small noise absorption inside the tire a noise level increase or amplification, so to speak, is provided inside the tire. As a result, the so-called internal tire noise is radiated outwardly through the sidewalls of the tire surfaces which have a smaller attenuation than the tire tread. The relatively high frequency humming tone of truck tires, for example, is due to the just explained fact that the tire sidewalls have a lower noise insulation quality than the tire tread.

OBJECTS OF THE INVENTION

In view of the above it is the aim of the invention to achieve the following objects singly or in combination:

to effectively reduce the noise radiation generated by tires without any basic changes in the tire structure itself;

to provide an effective tire noise reduction even subsequent to the actual manufacturing of the tires, in other words, the noise reducing means should be installable even on wheels already in use; and to provide an effective noise reduction inside the space confined by the inner tire walls and the radially outwardly facing rim surface to avoid the internal amplification.

SUMMARY OF THE INVENTION

According to the invention there is provided a method for reducing the tire noise on vehicles by locating inside the space confined by the inner tire walls a noise absorbing or insulating material, whereby the noise level elevation or amplification inside the tire space is eliminated or substantially eliminated.

The noise absorbing and/or insulating or attenuating means may be secured to the inner surfaces of the tire itself and/or to the surface of the rim facing radially into the tire.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Incidentally, the embodiments shown in FIGS. 1, 2, 3, 4, 5, and 6 are best suitable for so-called tubeless tires. However, it would appear to be possible to employ innertubes in the embodiments of FIGS. 5 and 6 because the relatively soft foam material of the noise absorbing or insulating or attenuating material would not interfere with the presence of an innertube.

Figure 1:
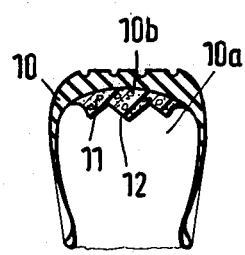
FIG. 1 is a cross-sectional view through a tire with a damping insert according to the invention.

FIG. 1 shows a tire 10 having an inner surface 10b opposite the tread. A noise absorbing or attenuating or insulating material 11 is secured to this inner surface 10b inside the tire volume 10a. The securing means may, for example, comprise a suitable adhesive or the like. The noise absorbing, or insulating, or attenuating material 11, hereinafter simply called the material, may, for example, comprise a foam material having large volume open cells. A textile material, steel wool, and the like have been found to be suitable for the purpose. In any event, the material 11 should have as large a surface as possible. The outer surface of the material 11 could be increased, for example, by a corrugation 12, by protrusions such as pyramids or burls or any other surface increasing configuration. The shown configuration has been found to be advantageous for acoustical reasons as well as for centrifugal load reasons. It is also suitable to arrange the foam material in layers in such a manner that the lower layer, namely the layer closer to the inner surface 10b has a mechanical stiffness larger than the outer layers located closer to the rotational axis of the tire. Thus, the stiffer layer closest to the inner tire surface functions simultaneously as a spacer member.

Figure 2:
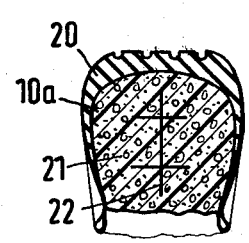
FIG. 2 is a view similar to that of FIG. 1, however showing that the noise absorbing or attenuating material substantially fills the inner space of the tire and that a reinforcing member may be inserted into the noise absorbing material.

In the embodiment of FIG. 2, the volume 10a of the tire 10 is completely or substantially completely filled with an open cell foam material 21 having a rough structure or rather large volume open cells. It may be desirable for improving the wear and tear to insert into the foam material 21 reinforcement means 22, for example, a rib structure of synthetic material as shown.

Figure 3:
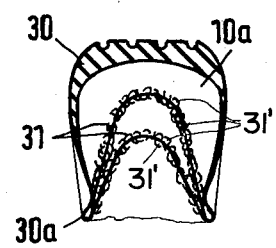
FIG. 3 shows a further modification with several noise absorbing or damping endless belts secured inside the tire volume.

FIG. 3 shows an embodiment in which at least one, preferably two noise damping relatively flat endless belts 31 of air permeable material form the means for connecting the noise absorbing material to the inside of the tire. The endless belts are operatively secured to the tire edges or beads 30a, for example, by a suitable adhesive. The noise absorbing material 31' may be secured to the webbing or belts 31 by adhesives or the like or the material 31' may be bonded to the webbing or belts 31. The presence of these webbings or belts 31 inside the tire with the material 31' secured thereto does not interfere with the inflating of the tire 30. Similarly, the presence of the foam material in the tire 20 shown in FIG. 2 does not interfere with the inflated condition of the tire by air under pressure when the tire is in use.

The embodiments so far described are particularly suitable for installation in tires after the tires have been manufactured. In other words, the improvements may be installed even on tires presently in service.

Figure 4:
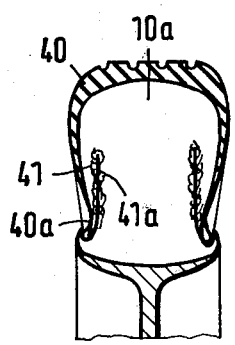
FIG. 4 shows an embodiment in a sectional view in which the noise absorbing means comprise elastic ring members to which the noise damping or insulating material is attached.

FIG. 4 shows an embodiment in which the tire 40 is equipped with flexible ring type relatively flat disks 41 forming the means for connecting the noise absorbing material to the tire. The disks 41 form an integral part of the inner tire walls in that these disks are bonded at the radially inner edge thereof to the tire bead 40a so that the radially outer end of the ring or disk 41 is relatively free to move inside the tire volume 10a. The material 41a is secured to the rings or disks 41 again, for example, by a suitable adhesive. The disks or rings 41 may be manufactured simultaneously with the manufacture of the tire in one casting so to speak. However, it is also possible to subsequently secure the rings or disks 41 to the tire beads 40a. When the tire rotates, the rings or disks 41 will assume the position shown in FIG. 4. In any event, these rings or disks 41 are rather flexible and hence do not interfere with the intended normal use of the tire.

Figure 5:
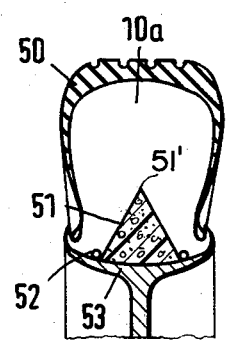
FIG. 5 is a sectional view through an embodiment in which the noise absorbing material is secured to the wheel rim, for example, by means of clamping rings.

FIG. 5 shows an embodiment in which the teaching of the invention is realized by securing the material 51 inside the volume 10a of the tire 50, however, not to the tire itself, but rather to the wheel rim 53, more specifically to the wheel rim surface facing radially outwardly into the tire volume 10a. The material 51 with its triangular cross-sections forms an endless ring with the ridge or tip 51' facing radially outwardly into the tire volume 10a preferably centrally of the rim 53 and tire 50. The material 51 may be held in place, for example, by clamping rings 52. However, an adhesive securing means may also be used. In a further alternative, the foam material ring 51 may have an inherent elasticity so that it may be secured to the rim 53 by snapping the material ring 51 onto the rim 53.

Figure 6:
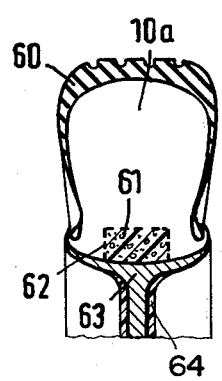
FIG. 6 is a further embodiment in which the noise absorbing materials are secured to the wheel rim inside the tire volume, for example, by an adhesive.

In FIG. 6 the tire 60 is held on a rim 63 and the material 62 is located inside an air permeable housing 61 secured to the radially outwardly facing surface of the rim 63 as described above with regard to FIG. 5. The rim 63 may be provided with a vibration or droning reducing coating 64 also of foam material or the like secured by adhesive.

Figure 7:
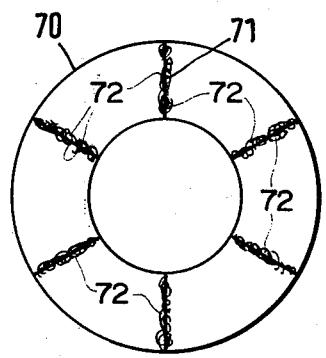
FIG. 7 is a side view into a cut open tire illustrating a further embodiment of the arrangement of the damping or noise insulating layers.

FIG. 7 shows a side view of a tire 70 cut open and illustrated in a somewhat schematic manner. The noise absorption, damping or insulation is accomplished by relatively flat, flexible air permeable cross walls 71 having secured thereto the noise absorbing material 72, for example, by an adhesive as disclosed above. The cross walls or webs extend radially outwardly, thus forming a somewhat star shaped configuration. The cross walls 71 are secured to the inner tire surface along the edges of the walls 71 at least at certain points along these edges.

Figure 8:
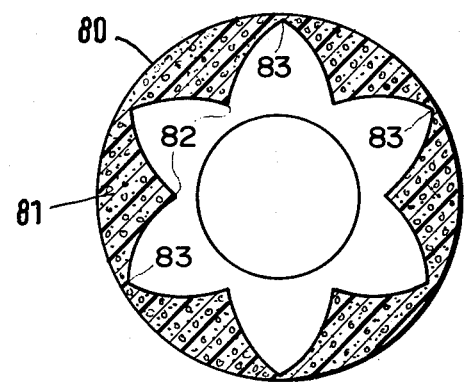
FIG. 8 is a view similar to that of FIG. 7, however showing a modified configuration of the noise absorbing, insulating and/or attenuating means.

FIG. 8 shows a tire 80 in a cut open illustration with noise absorbing material 81 secured to the inner tire surfaces in such a manner that a rosette type configuration results having radially inwardly pointing peaks 82 of noise absorbing material and radially outwardly facing valleys 83 of tire volume. The noise absorbing material 81 is secured to the inner surface of the tire, for example, by adhesive. The open cell foam material has a small volume relative to the tire volume as shown in FIG. 8, to avoid a run-flat ability.

All the above described examples illustrate how with the teaching of the invention a noise amplification inside the tire volume is substantially reduced or even completely eliminated to thereby substantially reduce any resulting radiation laterally outward of the tire. As mentioned, some of the embodiments are also suitable for tires employing innertubes. For example, the embodiment of FIG. 4 could be used in such a fashion and possibly also the embodiment of FIG. 1. Another advantage of the invention is seen in that the so-called inner volume resonance or rather excitation caused by mechanical tire vibrations are relegated to play an insignificant part because body noise transmission through the tire rim is substantially reduced. Any remaining body noise transmission through the tire rim may be further diminished by the anti-droning coating 64 shown in FIG. 6.

As shown in FIGS. 3, 4, and 7, it is a common feature of these embodiments that both side surfaces of the relatively flat connecting members 31, 41, and 71 are substantially exposed to the air inside the tire whereby the open cell foam material surfaces are also exposed to the air in the tire for optimizing the noise absorbing efficiency without providing a run-flat capability, since the foam material does not contact the inner tire surface. In FIG. 8 the contact between the foam material and the inner tire surface is also kept as small as possible for the rosette configuration.

Although the invention has been described with reference to specific example embodiments, it will be appreciated, that it is intended to cover all modifications and equivalents with the scope of the appended claims.

What is claimed is:

1. A wheel tire not having a run-flat ability, comprising a tire body having an inner surface defining an inner tire volume, noise absorbing means in the form of an open cell foam material inside only a portion of said inner tire volume, means securing said noise absorbing open cell foam material to portions of said inner surface of said tire body, said noise absorbing material having a given size and a large surface area relative to its given size, said large surface area with the open cells being sufficient to substantially avoid noise level amplification or space resonance amplification in said tire volume, and wherein said securing means for said noise absorbing means comprise at least one, preferably a plurality of noise absorbing relatively flat connecting members, both surfaces of which are covered with said open cell foam material to hold said large surface area of open cells substantially out of contact with said inner tire surface, said flat members having at least one edge connected to said inner tire surface for securing the open cell foam material inside the tire while leaving both sides of said flat connecting member substantially exposed to the air inside the tire.

2. The tire of claim 1, wherein said relatively flat connecting members for securing said noise absorbing open cell foam material inside the tire comprise at least one, preferably a plurality of noise damping endless belts, both surfaces of which are covered with said open cell foam material to provide said large surface area, each of said endless belts being attached to said inner tire surface at both belt edges, whereby the belt surfaces with the open cell foam material thereon loop into the tire volume thereby leaving the open cell foam material exposed inside the tire volume.

3. The tire of claim 1, wherein said relatively flat connecting members for securing said noise absorbing means comprise at least one elastical ring member (41), said open cell foam material coating both surfaces of said elastical ring member, said elastical ring member being attached to said inner tire surface along a radially inner edge of said elastical ring member (at 40a) so that the elastical ring member reaches substantially radially outwardly into said inner tire volume with both of its surfaces with the open cell foam material thereon being substantially exposed to the air in the tire.

4. The tire of claim 1, wherein said relatively flat connecting members for securing said noise absorbing means comprise air permeable cross-walls (71) each having two surfaces coated with said open cell foam material, said cross-walls extending radially inside said tire substantially in the manner of spokes, said cross-walls having side edges connected to said inner tire surface thereby leaving said coated surfaces with said open cell foam material substantially exposed to the air in said tire.

5. A wheel tire, comprising a tire body having an inner surface defining an inner tire volume, noise absorbing means in the form of an open cell foam material inside only a portion of said inner tire volume, means securing said noise absorbing open cell material to said inner surface of said tire body, said noise absorbing material having a given size and a large surface area relative to its given size, said large surface area with the open cells being sufficient to substantially avoid noise level amplification or space resonance amplification to said tire volume, and wherein said noise absorbing means of open cell foam material has a central opening with a rosette type configuration with radially inwardly pointing peaks (82) and with radially outwardly pointing valley bottoms for forming in said open cell foam material said large surface area facing radially inwardly and being exposed to the air in the tire, said rosette type configuration having side surfaces in contact with said inner tire surface, whereby said radially inwardly pointing peaks of open cell foam material partially cover inner tire surfaces with said rosette type configuration for avoiding said space resonance amplification inside said tire, said opening with the rosette type configuration being large enough to avoid a run-flat ability.

* * * * *